United States Patent [19]

Paton

[11] Patent Number: 5,595,268
[45] Date of Patent: Jan. 21, 1997

[54] FLUID ACTUATED FRICTION DAMPER

[76] Inventor: H. Neil Paton, 1460 Elliott Ave. West, Seattle, Wash. 98119-3124

[21] Appl. No.: 408,129

[22] Filed: Mar. 21, 1995

Related U.S. Application Data

[63] Continuation of Ser. No. 235,280, Apr. 29, 1994, abandoned, which is a continuation-in-part of Ser. No. 87,067, Jul. 7, 1993, abandoned, which is a continuation-in-part of Ser. No. 25,674, Mar. 3, 1993, abandoned.

[51] Int. Cl.$^6$ ............................................. F16F 7/08
[52] U.S. Cl. ...................... 188/271; 188/129; 188/322.21
[58] Field of Search ................................. 188/129, 271, 188/366, 367, 381, 301, 264 R, 264 B, 315, 318, 320, 282, 322.17, 322.18, 322.21, 322.22; 267/196–198, 134, 200, 201

[56] References Cited

U.S. PATENT DOCUMENTS

| | | | |
|---|---|---|---|
| 2,928,507 | 3/1960 | Thompson | 188/271 |
| 3,054,478 | 9/1962 | Rumsey | 188/271 |
| 4,728,084 | 3/1988 | Bauer et al. | 188/315 X |
| 4,825,746 | 5/1989 | Herner | 188/271 X |
| 4,838,393 | 6/1989 | Mourray et al. | 188/322.17 X |
| 4,854,384 | 8/1989 | Campbell | 188/271 X |
| 4,881,723 | 11/1989 | Bauer et al. | 188/271 X |
| 4,979,595 | 12/1990 | Paton | 188/129 |
| 5,265,852 | 11/1993 | Taylor | 188/322.17 X |

FOREIGN PATENT DOCUMENTS

| | | | |
|---|---|---|---|
| 0292881 | 11/1988 | European Pat. Off. | 188/271 |
| 0485647A1 | 5/1992 | European Pat. Off. | |
| 749695 | 5/1956 | United Kingdom . | |

OTHER PUBLICATIONS

Asle ad Theberge, "Wear Behavior of Thermoplastic Polymer-Filled PFTE Composites," Journal of the American Society of Lubrication Engineers vol. 33, 1, pp. 33–38 (date unknown).

Friedrich, Klaus, ed., "Friction ad Wear of Polymers Composites," Technical University–Hamburg, Harburg, 1986, pp. 2, 11, 15 ad 38.

Primary Examiner—Josie Ballato
Attorney, Agent, or Firm—Jim Zegeer, Esq.

[57] ABSTRACT

A fluid actuated friction damper having telescopically movable inner and outer bodies, the outer body having an elongated, continuous friction surface. The inner body includes a first set of friction shoes engageable with the continuous friction surface, a fluid pressure responsive device for exerting a normal force to urge the friction shoes against the continuous friction surface, and a shuttle device supporting the friction shoes for limited axial movement between end stops on the inner body. The inner body also provides fluid pressure communication between an external source of pressurized fluid and the fluid pressure responsive device when the shuttle is at one of the stops and for isolating the fluid pressure responsive device from the external source when the shuttle is moved from the one stop. A second set of friction shoes and a second fluid pressure responsive device for exerting a normal force to urge the second shoes against the continuous friction surface independently of the first set of friction shoes. The pressure responsive devices for both friction shoe sets are controlled by regulating the pressure of fluid supplied to the inner body from the external fluid pressure source but the first device is elastically biased to impose a friction drag on the shuttle. The normal force for both sets of friction shoes may be developed by a single externally controlled fluid pressure or, alternatively, by separate externally controlled fluid pressures. Also, the outer body is formed with an annular space between the friction surface and an outer wall to enable circulation of air for cooling.

27 Claims, 6 Drawing Sheets

FLUID ACTUATED FRICTION DAMPER

CROSS REFERENCE TO RELATED APPLICATION

This application is a continuation of application Ser. No. 08/235,280 filed Apr. 29, 1994, now abandoned, which is a continuation-in-part of application Ser. No. 08/087,067 filed Jul. 7, 1993, abandoned, which is a-continuation-in-part of application Ser. No. 08/025,674, filed Mar. 3, 1993, abandoned.

BACKGROUND OF THE INVENTION

This invention relates to shock absorbers, and, more particularly to fluid actuated friction dampers. The friction dampers of the present invention are useful for a wide range of friction damping applications but are intended principally for use in land vehicle suspension systems.

In U.S. Pat. No. 4,979,595, issued to the present inventor on Dec. 25, 1990, embodiments of a fluid actuated friction damper are disclosed in which relative movement between inner and outer telescopic bodies is damped by friction shoes on the inner body expanded by fluid pressure into engagement with a continuous internal surface on the outer body. In certain of the disclosed friction damper embodiments, an external dual pressure source is used to expand a single set of friction shoes under one pressure during one direction of relative inner and outer body movement and under a different pressure in the other direction of such relative movement. In other embodiments disclosed, a single external pressure source is applied alternately to axially spaced sets of friction shoes of differing effective area. Thus, in one direction of relative inner and outer body movement, the single fluid pressure is applied to one of the two sets of friction shoes whereas in the other direction of such relative movement, the same pressure is applied to the other of the two sets of shoes.

From the different embodiments disclosed in the prior patent, it is apparent that in one case, the friction force is changed upon directional reversal of body movement, while in the other case, the effective friction area is changed on directional reversal. In both cases, the relative direction of inner and outer body movement must be sensed, a controller is required to respond to the sensed direction of relative movement, and either the pressure of the fluid is required to be changed, as in the case of a dual pressure source, or the fluid flow path between the external source of fluid pressure is required to be changed, with each sensed direction of body movement reversal.

While the operational principles of the friction damper embodiments disclosed in the aforementioned patent are sound, the external pressurized fluid system is relatively complicated, and as such, costly from the standpoints of manufacture, installation and maintenance. As a result, the benefits of the controlled fluid pressure actuated friction damper represented by the embodiments disclosed in the prior patent have not been realized in a commercially competitive shock absorber market.

SUMMARY OF THE INVENTION

In accordance with the present invention, the problems associated with the relatively complex control systems required for the friction dampers of the type disclosed in the aforementioned patent are substantially avoided by a pressurized fluid actuated friction damper in which a regulated source of fluid pressure is maintained in communication with one or more internal pressure chambers ported selectively by a friction shoe member which is moveable directly in response to directional reversals of the relatively moveable inner and outer bodies.

Additional features and advantages of the invention will be set forth in part in the description which follows, and in part will be obvious from the description, or may be learned by practice of the invention. The advantages of the invention will be attained by means of the elements and combinations particularly pointed out in the appended claims.

In accordance with the purpose of the invention, as embodied and broadly described herein, the fluid actuated friction damper of the invention comprises telescopically movable inner and outer bodies, the outer body having an elongated, continuous friction surface. The inner body includes friction shoe means engageable with the continuous friction surface, fluid pressure responsive means for exerting a normal force to urge the friction shoe means against the continuous friction surface, and a shuttle device supporting the friction shoe means for limited axial movement between end stops on the inner body. The inner body also provides fluid pressure communication between a source of pressurized fluid and the fluid pressure responsive means when the shuttle means is at one of the stops and for isolating the fluid pressure responsive means from the external source when the shuttle means is moved from the one stop.

In another aspect of the invention, the fluid actuated friction damper includes a second friction shoe means and a second fluid pressure responsive means for exerting a normal force to urge the second shoe means against said continuous friction surface independently of the first mentioned friction shoe means. The pressure responsive means for both friction shoe means are controlled by regulating the pressure of fluid supplied to the inner body from the fluid pressure source. Further, the normal force for both friction shoes may be developed by a single externally controlled fluid pressure or, alternatively, by separate externally controlled fluid pressures.

In still another aspect of the invention, the outer body is formed of inner and outer cylindrical walls connected at opposite ends and separated from each other between the opposite ends by an annular space. The annular space forms part of a fluid passageway by which separated chambers, defined by opposite ends of the inner body, the inner cylindrical wall and the opposite ends of the outer body, are connected for venting air between the separated chambers upon relative movement of said inner and outer bodies to inversely vary the volume of such chambers, respectively.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention. In the drawings.

DETAILED DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

In accordance with the present invention, a fluid actuated friction damper is provided with inner and outer bodies arranged for telescopic movement relative to each other. In practice, the respective inner and outer bodies are connected to relatively movable members between which movement is to be inhibited or damped. In automotive vehicle suspension systems, such relative movement is termed "jounce" when the relatively movable members move toward one another and "rebound" when the members move away from each other. These terms will be used herein and in the appended claims irrespective of the specific application for which the invention is used.

At least one friction shoe is supported for limited axial movement on the inner body by a shuttle device associated with valving ports for opening and closing fluid communication between a regulated external pressure source and an internal pressure chamber by which the at least one friction shoe is forced into engagement with a continuous inwardly facing friction surface on the outer body. Movement of the shuttle on the inner body is responsive to the relative direction of inner and outer body movement. Preferably, shuttle movement opens communication between the external pressure source and the appropriate internal pressure chamber in response to rebound and closes off such communication in response to jounce.

In FIGS. 1–6, an exemplary embodiment of a fluid actuated friction damper incorporating the present invention is generally designated by the reference numeral 10 and shown to include an inner body 12 and an outer body 14 having a cylindrical inwardly facing friction surface 16. The surface 16 is formed on the interior of a thin walled cylindrical tube 18 supported at one end by an annular collar 20 and at the opposite end by an end wall 22. The collar 20 and end wall 22 are secured structurally by an outer body cylindrical wall 24. As illustrated, the inner wall 18 is spaced slightly from the outer wall 24 both to insulate the inner wall 18, particularly the inner surface 16 thereof, from physical deformation by external forces exerted on the outer wall 24 and also to provide an air passage for heat dissipation and cooling. In applications where the outer wall 24 is not subject to deformation by external forces, such as laterally induced tube collapsing forces or thermal distortion caused by welding, for example, the inner wall 18 may be eliminated and the surface 16 may be provided directly on the inside of the outer wall 24.

Figure 1:
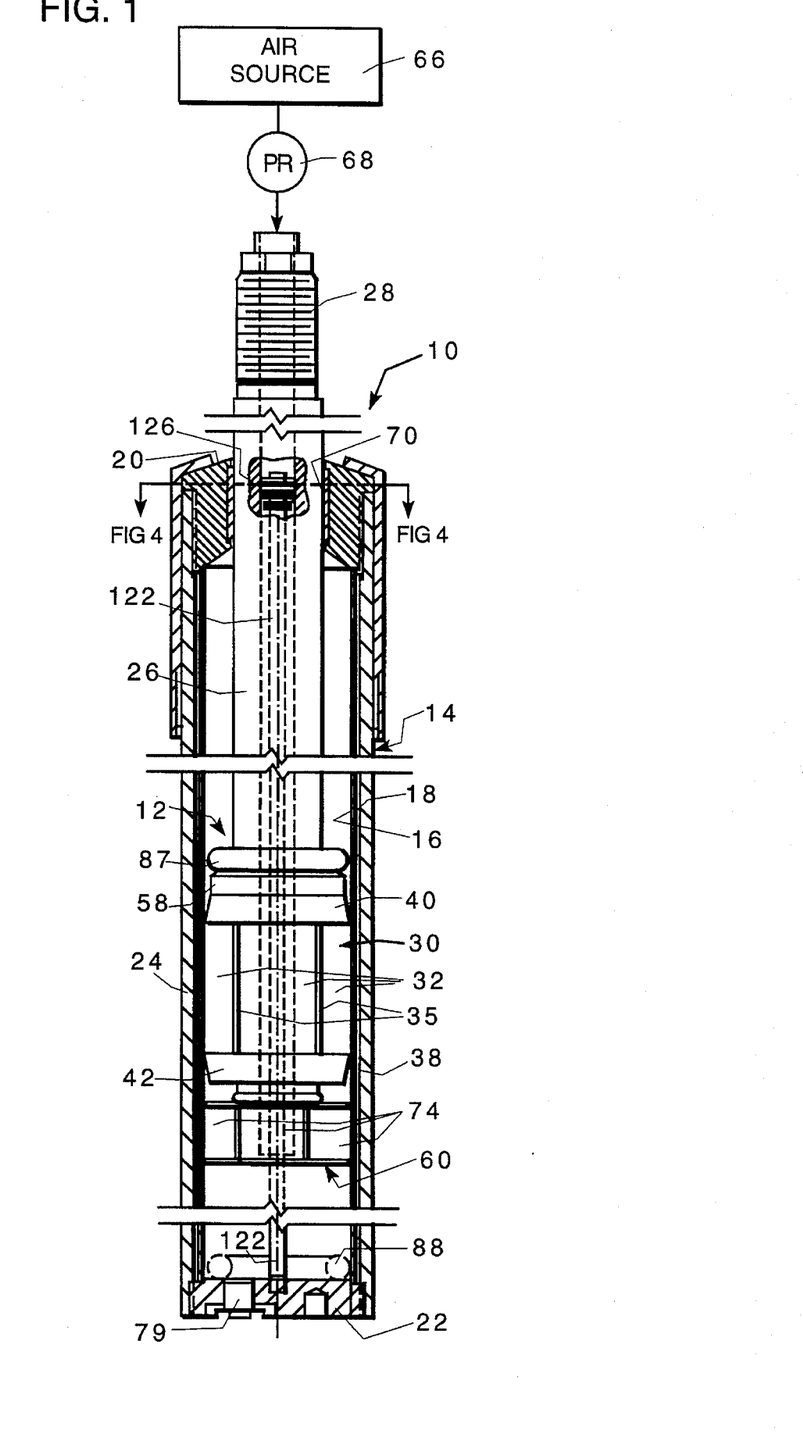
FIG. 1 is a fragmented partial longitudinal cross section depicting an embodiment of the present invention.
Figure 2:
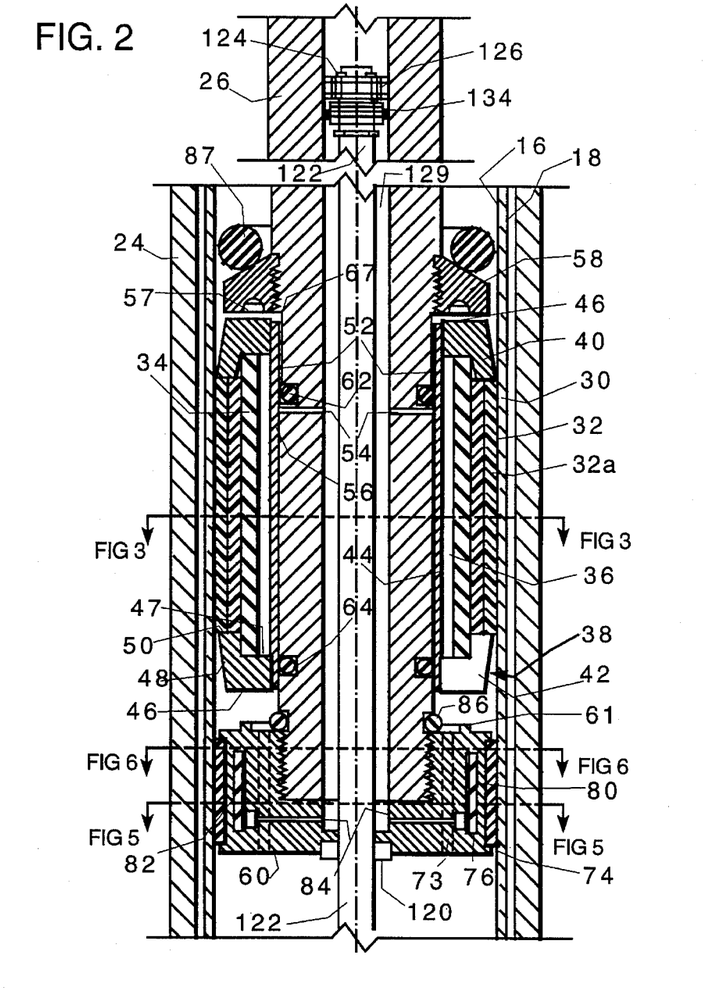
FIG. 2 is enlarged complete longitudinal cross section of a central portion of the embodiment illustrated in FIG. 1.

The inner body 12 includes an elongated hollow rod 26 extending through the collar 20 to an exterior threaded end 28 and supporting a friction shoe assembly 30 at its opposite or inner end. The threaded end 28 of the rod 26, in use, is fitted to one of the two members (not shown) between which movement is to be damped. The outer body 14 is connected to the other of such two members by an appropriate fitting (also not shown).

Figure 3:
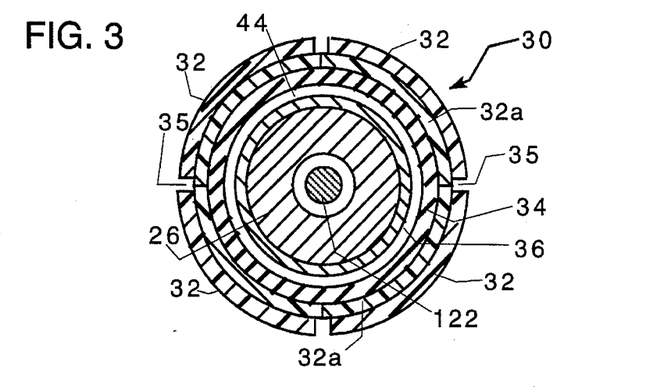
FIG. 3 is a cross section on line 3—3 of FIG. 2.

The friction shoe assembly 30 in the illustrated embodiment, as shown most clearly in FIGS. 1–3, includes four arcuately convex friction shoes 32 positioned radially outside of an expansible elastomeric tube 34 by arcuate shims 32a to which the respective shoes are connected or with which the respective shoes are integrally formed. Each of the shims 32a has an arcuate width greater than the corresponding dimension of each shoe 32. As a result, the shoes are always spaced from each other by gaps 35 and the inwardmost position of the shoes is determined by edge-to-edge engagement of the shims 32. The interior of the tube 34 defines part of an internal pressure chamber 36 by which the friction shoes 32 are forced outwardly into engagement with the friction surface 16 of the outer body 14.

As shown in FIG. 2, in the illustrated friction damper embodiment 10, the shuttle device is designated generally by the reference numeral 38 and includes end rings 40 and 42 integrally formed with or secured, such as by press fit, for example, to opposite ends of a cylindrical sleeve 44 dimensioned to be freely slidable on the outside of the hollow rod 26. Each of the end rings 40 and 42 is of a dish-shaped configuration to establish an exterior end abutment surface 46, an annular tube support surface 47, and an outwardly flared axial wall 48 terminating in a radial surface 50. The axial walls 48 of the end rings 40 and 42 extend toward each other to confine the ends of the elastomeric tube 34. The mutually facing annular support surfaces 47 on the end rings 40 and 42 are spaced to provide a compressive bias at the ends of the tubular wall 34 to cause the tube to bulge outward with no application of fluid pressure on the inside thereof. Also, the radial surfaces 50 of the end rings, being of fixed axial spacing by connection to the ends of the sleeve 44, serve to fix the axial position of the friction shoes 32 in the shuttle 38.

The provision of a normal bias of the friction shoes 32 into frictional engagement with the friction surface 16, independent of fluid pressure in the chamber 36, is important to operation of the shuttle to be described in more detail below. As indicated above, the natural bias may be effected by an outward bulging of the elastomeric tube 34 and the inclusion of shims 32a between the exterior of the tube 34 and the friction shoes 32.

Figure 11:
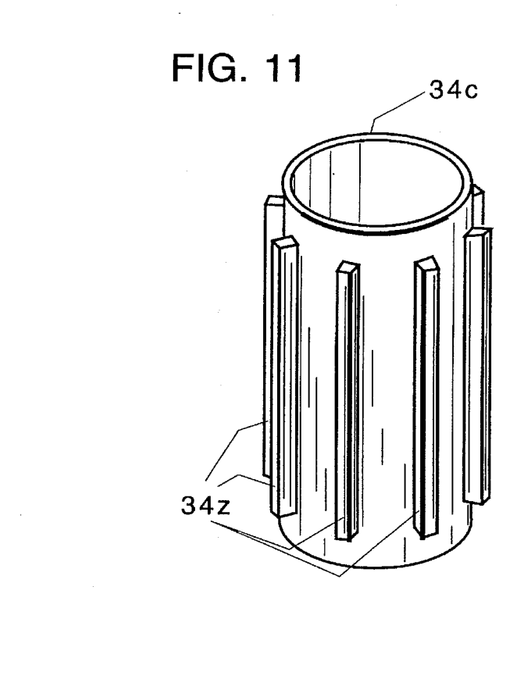
FIG. 11 is a perspective view of a modified pressure transmitting elastomeric tube usable in the embodiment of FIG. 1.

As shown in FIG. 11, a modified elastomeric tube 34a, which may be substituted for the tube 34 in the embodiment of FIGS. 2 and 3, includes a pair of spaced circumferential projecting ribs 34x. The ribs 34x, coupled with the elastomeric composition of the tube 34, ensure a normal outward bias force against the shims 32a, or directly against the shoes 32 without use of the shims 32a.

Figure 12:
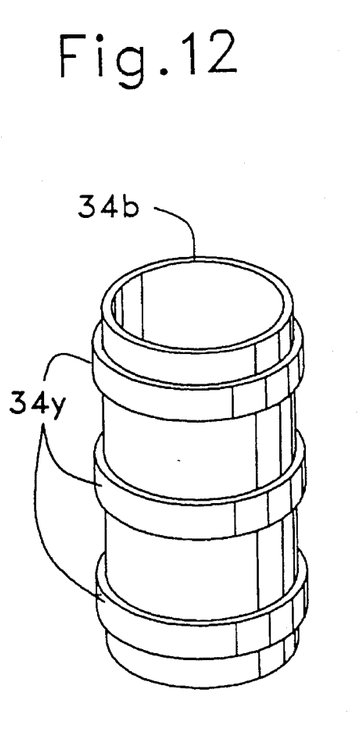
FIG. 12 is a perspective view of a variation of the tube shown in FIG. 11.
Figure 13:
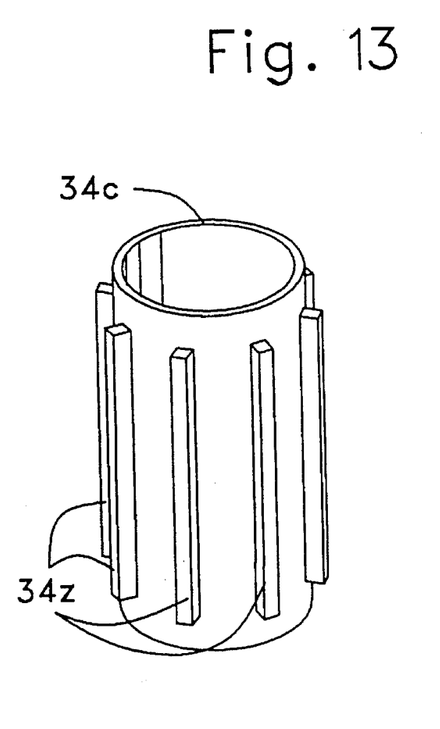
FIG. 13 is a perspective view of another variation of the tubes shown in FIGS. 11 and 12.

In FIGS. 12 and 13, further variations of the elastomeric tube are designated by the reference characters 34b and 34c, respectively. In these variations, the elastomeric tube 34b, 34c, is intended to be substituted for the tube 34 in FIGS. 2 and 3 and to be used without the shims 32a. In particular, in FIG. 12, the provision of three circumferential projecting ribs 34y would ensure a normal bias by the tube 34b directly against the back surface of the shoes 32. Similarly, in FIG. 13, longitudinally extending ribs 34z, which project radially from the outer surface of the tube 34c, will effect a normal bias of the shoes 32 against the friction surface 16.

The shuttle sleeve 44 is formed with a plurality of radial ports 52 which open outwardly to the pressure chamber 36 on the inside of the elastomeric tube 34. The hollow rod 26 is similarly provided with radial ports 54 which are interconnected by a peripheral manifold groove 56 on the exterior of the hollow rod 26.

The shuttle 38 is positioned on the hollow rod 26 between a first stop defined by a plurality of plug-like cushions 57 projecting from the inner face of a collar 58, threaded to the rod at a location spaced from the end of the rod 26, and a second stop defined by an end fitting 60 fixed to the inboard end of the rod 26. Preferably, the second stop is established by an annular rail 61 on the fitting 60. In this way, the second stop may be precisely formed by machining the rail and so that when the surface 46 on the shuttle 38 abuts the rail, the ports 52 and 54 are precisely aligned. Also the ports 54 and the manifold groove 56 are positioned on the hollow rod 26 between spaced O-rings 62 and 64 which make a sliding seal with the inside of the shuttle sleeve 44. In the axial space between the O-rings 62 and 64, passage of pressurized fluid between the inside of the shuttle sleeve 44 and the outside of the rod 26 is confined. Thus, movement of the shuttle 38 between a position in which the shuttle ports 52 are located beyond or outside of the space between the O-rings 62 and 64, that is, the position illustrated in FIG. 2, and a position in which the shuttle ports 52 are located between the O-rings, will close and open, respectively, fluid communications between the interior of the hollow rod 26 and the chamber 36 at the inside of the pressure responsive elastomeric tube 34. Also, and as shown in FIG. 2, the chamber 36 is vented to the exterior of the hollow rod 26, when the shuttle 38 is positioned so that the ports 52 lie outside of the space between the O-rings 62 and 64, by a necked portion 67 of the rod 26 and the space between the cushions 57.

As shown in FIG. 1, an external pressure source 66, represented schematically, is connected through a pressure regulator 68 to the interior of the hollow rod 26. While the amount of air pressure to which the interior of the hollow rod 26 is subjected is preferably variable, the pressure source is in communication with the interior of the hollow rod at all times during operation of the friction damper 10.

In accordance with the present invention, the inner and outer bodies are guided by an arrangement of bearings to ensure alignment of the bodies independent of fluid actuated friction components. Also, the bearings and friction components of the invention are constructed so that fluid pressure controlled friction damping is maximized as against uncontrolled parasitic friction and the unwanted effects of fluid compression or expansion resulting from relative movement of the inner and outer bodies.

Figure 4:
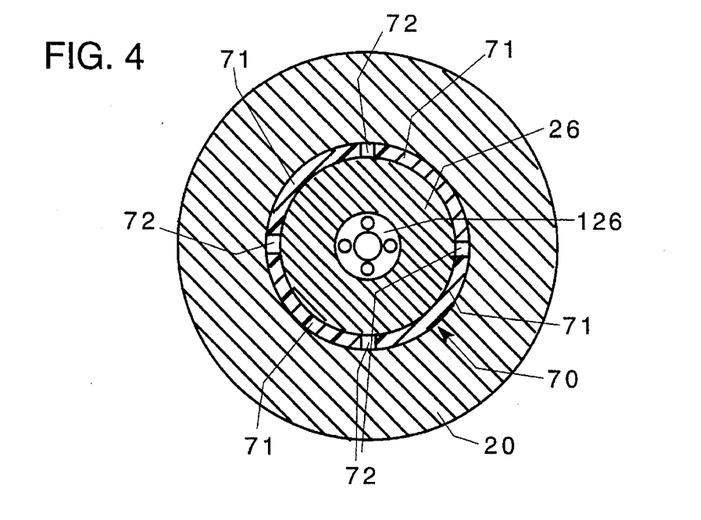
FIG. 4 is an enlarged cross-section on line 4—4 of FIG. 1.
Figure 5:
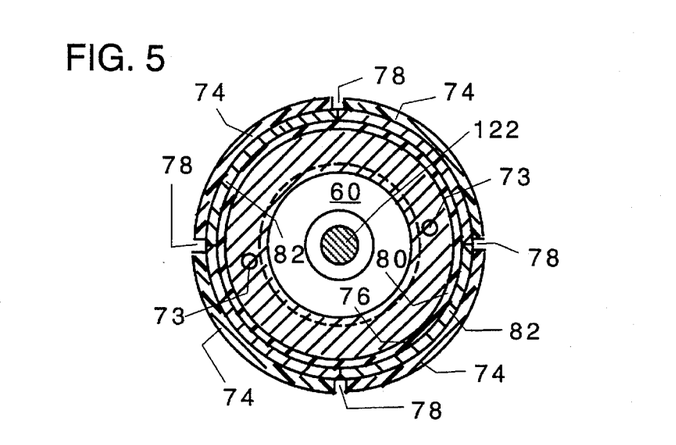
FIG. 5 is a cross-section on line 5—5 of FIG. 2.
Figure 6:
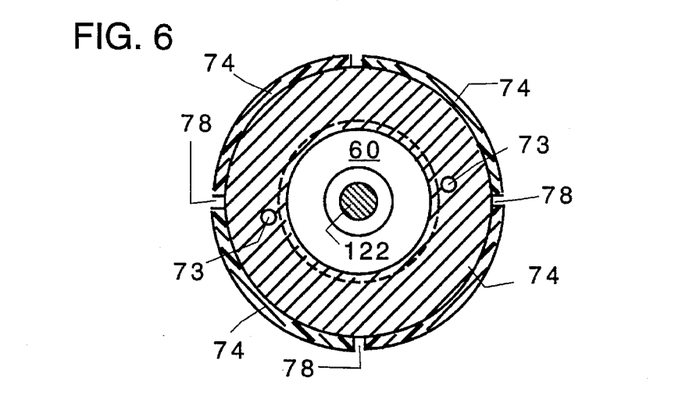
FIG. 6 is a cross-section on line 6—6 of FIG. 2.

In the illustrated embodiment and with particular reference to FIGS. 1 and 4 of the drawings, the hollow rod 26 of the inner body 12 is constrained to alignment with the collar 20 at one end of the outer body 14 by a slide bearing 70 at the inner surface of the collar 20. The bearing 70 is formed by four segments 71 of low friction material to be described in more detail below; however, it is contemplated that one or more such segments may be used in the bearing to provide symmetry of slide bearing support about the circumference of the hollow rod 26. It is to be noted that the segments 71 are spaced by radial gaps 72. The gaps 72 provide venting passageways by which air within the outer body 14 between the inner end of the inner body 12 and the collar 20 may be vented to atmosphere. Similarly, the gaps 35 between the shuttle carried friction shoes 32 provide venting passageways between the friction shoe assembly 30 and the inner friction surface 16 of the outer body 14. Also, and as shown in FIGS. 2, 5 and 6, the end fitting 60 is formed with axial vent ports 73 to avoid any compression of air caused by relative movement of the shuttle toward the end fitting. The ports 73 are additionally sized and oriented to function as spanner engagement holes by which the end fitting 60 may be threaded onto the hollow rod 26.

In the illustrated embodiment, the venting gaps 35 and 72 are provided by the use of multiple, circumferentially spaced shoes. However, a single, axially split, cylindrical shoe could be used. In the case of such a cylindrical friction shoe or guide bearing, spaced axial grooves may be cut or otherwise formed in the sliding surface thereof.

A further guide bearing arrangement is provided on the fitting 60 at the inner end of the hollow rod 26. As may be understood by reference to FIGS. 2, 5 and 6 of the drawings, the outer periphery of the fitting 60 is recessed to receive a plurality of outwardly convex arcuate segments 74. Inwardly of the peripheral recess in which the segments 74 are received, the fitting 60 is provided with an undercut formation 76 in a manner such that the opposite axial ends of the segments 74 bear directly against the body of the fitting 60. As a result, the axial ends of the segments are confined between the fitting 60 and the inner surface 16 of the outer wall to provide bearing support between the inner end of the rod 26 and the outer body 14. As may be seen in FIGS. 5 and 6, four segments 74 are employed in the illustrated embodiment, the segments being spaced by gaps 78 again for the purpose of permitting air to be vented across the fitting 60 in the outer body 14 as the inner body moves axially in the outer body. As indicated above with respect to the bearing 70, the use of four segments provides symmetry of bearing support at the end of the inner body 12 about the circumference of the fitting 60. However, it is contemplated that other symmetrical arrangements, such as one or more such segments, may provide the equivalent bearing support.

A further venting provision is provided at the closed end of the outer body. In the illustrated embodiment and as shown in FIG. 1, a filtered vent plug 79 is mounted in the end wall 22. Thus any tendency for air to compress by jounce movement of the inner body 12 toward the closed end of the outer body will be avoided by venting air through the vent plug 79. Similarly, any reduction of air pressure on rebound movement of the inner body away from the closed end 22 will be minimized by air passing inwardly through the vent plug 79.

In accordance with the present invention, a controlled pressure actuated friction force may be exerted at all times between the inner and outer bodies. Such controlled friction force will be applied between the bodies during both jounce and rebound relative movement between the two bodies.

In the illustrated embodiment, the controlled fluid pressure actuated friction force is applied to the arcuate segments 74 which define the bearing support for the inner end of the hollow rod 26. In particular, the under cut portion 76 of the fitting receives an elastomeric tubular member 80 having properties similar, if not identical, to the properties of the elastomeric tube 34 described above with reference to the friction shoe assembly 30. Outwardly of the elastomeric tube 80, a plurality of arcuately convex shims 82 are positioned so as to lie between the outside of the elastomeric tube 80 and inside of the bearing shoe segments 74. Inside the elastomeric tube 80, the under cut formation 76 defines an internal pressure chamber to which compressed air from the external source 66 is supplied by way of the hollow rod 26 through radial ports 84. A sealed drain plug 85 is threaded into the bottom of the end fitting 60 to facilitate draining of any liquid condensate which may accumulate in the hollow rod 26.

In light of the construction of the end fitting 60 as thus shown and described, the axial central region of the bearing segments 74 function as fluid actuated friction shoes forced by fluid pressure against the inside surface 16 of the outer body 14. At the axial ends of the bearing segments 74, the guiding function of the segments is preserved because the direct bearing of the ends of the segments against the end fitting is independent of fluid pressure.

In accordance with the invention, provision is made for cushioning the end limits of moving component travel. As shown in FIG. 2 and as mentioned above, movement of the shuttle toward the collar 58 is stopped by the plug-like cushions. To cushion the end limit of shuttle travel against the rail 61 on the fitting 60, an O-ring 86 is supported adjacent the stop surface of the end fitting 60 in the illustrated embodiment. The O-ring 86 is retained by a relatively shallow circumferential groove in the hollow rod 26 so as to project into the path of the end of the shuttle 38. Thus as the shuttle moves between the end stops defined by the collar 58 and the end fitting 60, it is cushioned at the end of such relative travel by the cushions 57 and the O-ring 86, respectively.

In addition, relative travel between the inner body and the outer body between the maximum physical limits of travel is similarly cushioned. In the illustrated embodiment, a relatively large elastomeric O-ring 87 is supported on the hollow rod 26 between the friction shoe assembly 30 and the interior of the end collar 20. A similar O-ring 88 is positioned between the end fitting 60 on the inner body 12 and the end wall 22 on the outer body. Thus, in the event that the bodies move through the maximum permitted travel, the large elastomeric O-rings 87 and 88 will cushion the engagement of components with each other.

In accordance with the present invention, the material of all nonmetallic friction members, for example, the segments 71 of the collar bearing 70, the shuttle carried friction shoes 32, and the bearing/friction shoe segments 74 on the end fitting 60, in the illustrated embodiment, is preferably selected to develop interfacial friction by composite/counterface interface with the metal surfaces in which they are in contact. Examples of such materials are polytetrafluoroethylene (PTFE) filled polyphenylene sulfide (PPS), ultra high molecular weight polyethylene, or a composite of PFTE and ultra high molecular weight polyethylene. Such materials exhibit very low coefficients of friction as a result of wear debris from the PTFE, for example, forming a very effective dry lubricant as an interface between the friction shoes or guide segments and the metal surfaces with which they are in contact. Also, unlike conventional Coulombic friction interfaces, the static coefficient of friction of composite/counterface interfaces, in accordance with the present invention, is lower than the dynamic coefficient of friction. As a result, the "stick/slip" behavior of conventional friction materials is avoided.

Although the friction damper of the present invention is useful in a wide range of motion damping applications, it is principally intended for use in land vehicle suspension systems. In an automotive application, for example, the damping device might be used as a suspension strut or as a shock absorber. In this application, a single friction device 10 is mounted between the chassis and each wheel of the vehicle by connecting the threaded end 28 on the hollow rod 26 to the chassis and connection of the outer body 14 to a wheel supporting axle or equivalent. The external pressure source 66, manifested in practice by an air compressor and pressure storage tank, for example, is supported on the chassis and connected by conduits to the hollow rods of each friction damper device 10. A single pressure regulator ensures that the magnitude of fluid pressure supplied to all friction damper devices 10 will be the same. Through use of appropriate conduit connections, the pressure regulator 68 may be located in a position convenient to the operator of the automotive vehicle. In more sophisticated suspension systems, such as "active systems," for example, a separate pressure regulator may be provided for each device.

During operation, travel of the automotive vehicle will cause the inner and outer bodies 12 and 14 of the respective shock absorber devices 10 to move relative to each other in jounce and rebound directions of movement. The shuttle 38 on the inner body of each device will move between the stop collar 58 and the fitting 60 in correspondence with such inner and outer body movement.

In FIG. 2, the shuttle 38 is illustrated at its upward limit of travel, that is, with the abutment surface 46 of the end ring 40 engaged in abutment with the inner stop collar 58. In this position, the ports 52 are isolated by the O-ring 62 from the ports 54 and the manifold groove 56 so that fluid communication between the interior of the hollow sleeve 26 and the pressure chamber 36 inside the elastomeric sleeve 34 is closed. The illustrated position of the shuttle 38 in FIG. 2 is, moreover, the position the shuttle would take during relative jounce movement between the inner and outer bodies 12 and 14. As a result, during jounce movement, the friction shoes 32 are not forced by fluid pressure against the friction surface 16 of the outer body 14. However, controlled friction damping of inner and outer body movement in jounce will occur due to communication between the regulated external source of fluid pressure and the internal pressure chamber defined by the under cut portion 76 in the end fitting 60. In particular, such fluid pressure acting against the interior of the elastomeric tube 80 through the open ports 84 will exert a controlled force to urge the central portions of the bearing segments 74 into frictional engagement with the surface 16 of the outer body 14.

When the inner and outer bodies 12 and 14 move in the opposite direction, or in rebound, the shoes 32 maintain a sufficient drag on the surface 16 so that the shuttle 38 will move until the abutment surfaces 46 on the end ring 42 engage the upper surface of the end fitting 60. The drag adequate to insure such shuttle movement may be adjusted by varying the amount of end bias on the elastomeric tube 34 by the end rings 40 and 42, thus determining the amount of outward force exerted by outward bulging of the tube 34 with no internal pressure. In this position, the ports 52 on the shuttle sleeve 44 will be aligned with the manifold groove 56 at the exterior of the hollow rod ports 54 so that pressure inside the hollow rod 26 will be communicated with the internal pressure chamber 36 defined by the elastomeric tube 34. Thus, in rebound movement of the inner and outer bodies, the friction shoes 32 will be forced by a fluid pressure outwardly against the inner surface 16 of the outer body 14 in a manner to supplement the controlled frictional drag of the end fitting carried bearing segments 74 biased by the same fluid pressure in the described embodiment.

Because of the low coefficient of friction in the nonmetallic members 71, 32 and 74, the guiding function of the collar bearing 70 and of the end portions of the shoe segments 74 in the illustrated embodiment, will have little or no parasitic frictional damping effect on relative movement of the inner and outer bodies 12 and 14. On the other hand, a combination of friction surface area and normal force is available to control the frictional drag exerted between the inner and outer bodies. For example, the shuttle carried friction shoes 32 in the illustrated embodiment are shown to have much larger surface area than the surface area of the shoes 74 or portion thereof subject to variable normal force by regulated fluid pressure. As a result, the frictional drag for a given normal force is significantly greater in rebound than it is in jounce movement of the inner and outer bodies. It is contemplated, therefore, that the respective surface area sizes of the shoes 74 may be selected to provide only a slight added friction drag in rebound as compared to jounce, given the general construction of the illustrated friction damping embodiment 10.

Figure 7:
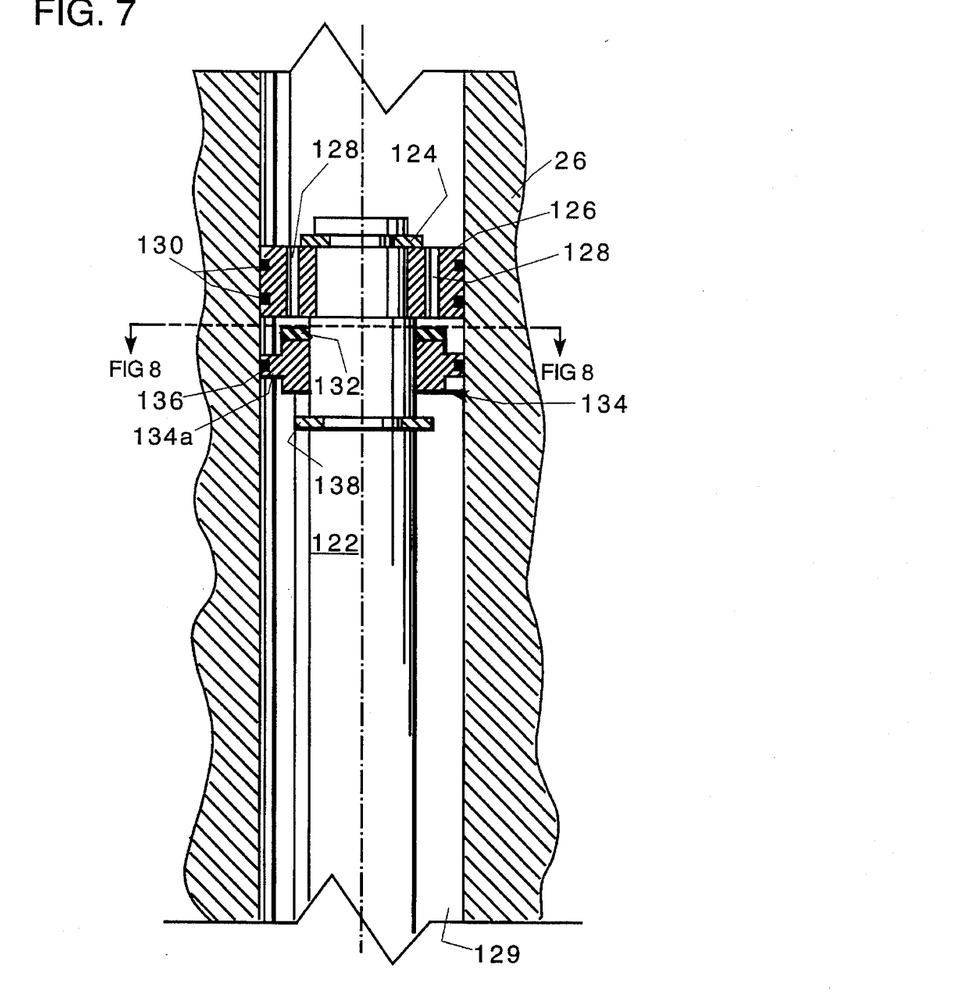
FIG. 7 is a largely schematic view illustrating an alternative embodiment of the present invention.

In FIG. 7, an alternative embodiment of the present invention is shown to be incorporated in a friction damper, generally designated by the reference numeral 90, and in which parts previously described are identified by identical reference numerals. In the embodiment of FIG. 7, a multiport fitting 91 is connected between the air pressure source 66 and the interior of the hollow rod 26. Fluid pressure is supplied by the regulator 68 through a port 92 of the fitting 91, directly to the interior of the hollow rod 26. Communication of fluid pressure between the regulator 68 and the friction shoe assembly 30, through the port 92, is the same as the embodiment described with reference to FIGS. 1–6. In the friction damper 90 of FIG. 7, however, a closed pipe 93 extends from a separate port 94 in the fitting 91 to a plug 95 located above the ports 84 which open to the internal chamber positioned behind the pressure responsive elastomeric member 80 in the end fitting 60. The plug 95 thus closes off or isolates the pressure responsive member 80, by which the central portions of the shoe segments 74 on the end fitting 60 are forced into engagement with the friction surface 16, from fluid pressure originating at the regulator 68. A separate pressure regulator 96 is provided between the air pressure source 66 and the conduit 90.

As a result of the modification shown in FIG. 7, the frictional drag applied between the bearing shoe segments 74 and the continuous friction surface 16 on the outer body 14, at all times during both jounce and rebound movement, may be regulated independently of the fluid pressure used to operate the friction shoe assembly 30 during rebound movement only. Thus, the measure of control over the operating characteristics of the friction damper 90 is increased over that available with the fiction damper 10 described above with reference to FIGS. 1–6. In both embodiments, however, highly effective, controlled friction damping operation is provided by a relatively simple damper construction, which is inexpensively manufactured and installed, and which is capable of low maintenance operation.

In accordance with a further feature of the present invention, the annular space separating the inner and outer cylindrical walls of the outer body forms part of a fluid passageway for venting air between separated chambers in the outer body at opposite ends of the inner body. As the volumes of those chambers vary inversely upon relative movement of the inner and outer bodies, the venting of air between the chambers serves to maintain pressure in equilibrium. Additionally, the annular space may be vented to the atmosphere for cooling purposes.

Figure 8:
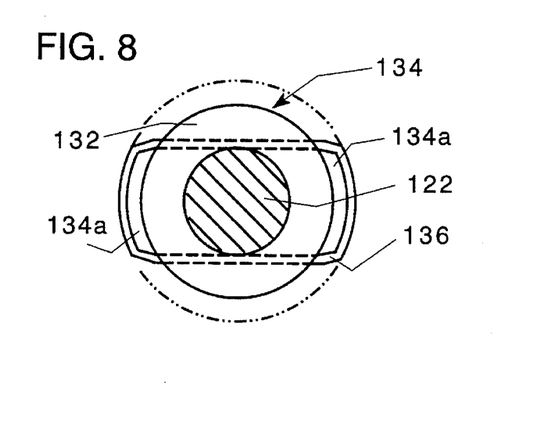
FIG. 8 is a fragmented longitudinal cross-section illustrating a variation applicable to both illustrated embodiments of the invention.
Figure 9:
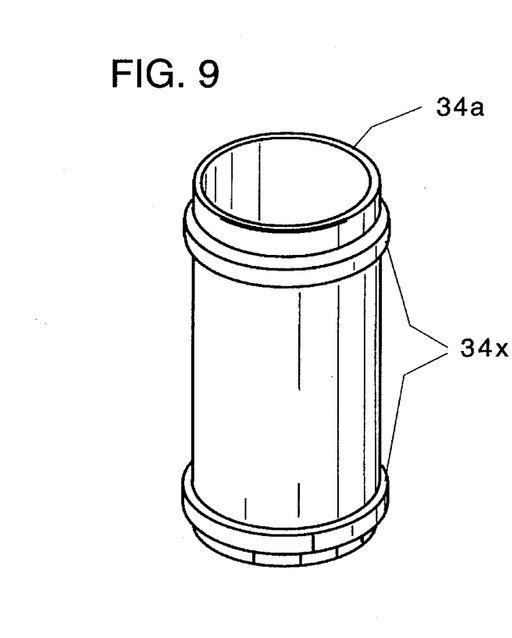
FIG. 9 is an enlarged fragment of the cross-section in FIG. 8.
Figure 10:
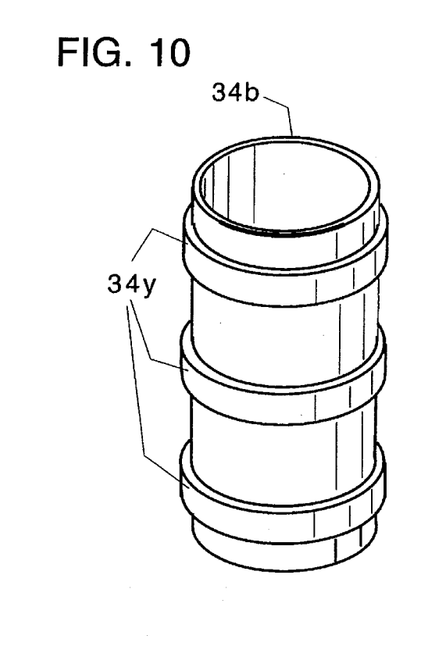
FIG. 10 is a cross-section on line 10—10 of FIG. 9.

In FIGS. 8–10, a variant of the friction damper embodiment described with reference to FIG. 1 is designated generally by the reference numeral 10'. Parts previously identified with reference to FIG. 1 are designated by the same reference numerals.

As previously described, the outer body 14 of the friction damper 10' is defined by inner and outer cylindrical walls 18 and 24, respectively, separated by an annular space 100. The annular space extends for the length of the device 10 between the connections of the inner and outer walls at one end by the end wall 22, and at the other end by the annular collar 20. In the friction damper variant 10', radial ports 102, specifically four such ports, extend through the inner cylindrical wall 18 near opposite ends thereof. As a result, as the inner body 12 is moved relative to the outer body 14, the chambers defined at opposite ends of the inner body with the outer body will vary in volume. To avoid the effects of fluid pressure on the relative movement between the inner and outer bodies, the passageway provided by the ports 102 and the annular space 100 vents air between the chambers to equalize fluid pressure irrespective of volume changes in the two chambers.

Additionally, and as shown most clearly in FIG. 9 of the drawings, the annular chamber 100 is vented to the atmosphere. In this respect, the upper end of the fluid actuated friction damper, both as illustrated in FIG. 8 and in the previously described embodiments, is provided with an exterior end bell 104 having an inwardly inclined annular flange portion 106 at its upper end in firm engagement with the annular collar 20. The end bell 104 further includes a depending cylindrical skirt portion 108 which is spaced outwardly from the outer wall 24 of the outer body 14 by an annular clearance gap 112.

In the variant of FIGS. 8–10, the annular collar is provided with venting slots 110 so that the passageway defined by the annular clearance 112 between the end bell 104 and the outer wall 24 is opened to the atmosphere. Radial ports 114 are formed in the outer wall near the end thereof, connected by the annular collar 20. Thus, the annular space 100 between the inner wall 18 and the outer wall 24 of the outer body 14 is vented to the atmosphere along the annulus 112 and slots 110 in the collar 20. As a result of this construction, heat developed by friction between the inner body 12 and the friction surface 16 may be dissipated by air circulating outwardly through the ports 114, annulus 112 and slots 110.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A fluid actuated friction damper comprising:

telescopically movable inner and outer bodies;

the outer body having an elongated, continuous friction surface;

the inner body comprising friction shoe means engageable with said continuous friction surface, fluid pressure responsive means for exerting a normal force to urge said friction shoe means against said continuous friction surface, a shuttle device supporting said friction shoe means, said shuttle device being axially movable between end stops on said inner body by frictional drag between said friction shoe means and said friction surface upon relative axial movement of said inner and outer bodies, and means for establishing fluid pressure communication between an external source of pressurized fluid and said fluid pressure responsive means when said shuttle device is at one of said stops and for isolating said fluid pressure responsive means from said external source when said shuttle device is moved from said one stop.

2. The fluid actuated friction damper recited in claim 1 wherein said friction shoe means is a first friction shoe means, said fluid pressure responsive means is a first fluid pressure responsive means, and wherein the inner body further comprises second friction shoe means and a second fluid pressure responsive means for exerting a normal force to urge said second friction shoe means against said continuous friction surface independently of said first friction shoe means.

3. The fluid actuated friction damper recited in claim 2 wherein said first friction shoe means and said second friction shoe means are urged against said continuous friction surface under the same fluid pressure.

4. The fluid actuated friction damper recited in claim 2 wherein said first friction shoe means and said second friction shoe means are urged against said continuous friction surface under different fluid pressures.

5. The fluid actuated friction damper recited in claim 2 wherein said friction surface comprises an interior cylindrical surface and wherein each of said first and second friction shoe means comprises at least one arcuately convex segment engageable with said interior cylindrical surface.

6. The fluid actuated friction damper recited in claim 5 wherein said at least one convex segment is provided with at least one venting gap for air passage between said inner and outer bodies.

7. The fluid actuated friction damper recited in claim 2 wherein said outer body includes a cylindrical wall and an interior cylindrical surface to establish said continuous friction surface, wherein said inner body includes a rod extending axially from an inner end within said cylindrical wall, beyond one end of said cylindrical wall to an outer end, and further comprising guide bearings for maintaining concentric alignment of said inner and outer bodies independent of said first and second friction shoe means.

8. The fluid actuated friction damper recited in claim 7 comprising a fitting on the inner end of said inner body to support said second friction shoe means and said second fluid pressure responsive means, said second friction shoe means extending axially beyond said second fluid responsive means to be supported directly by said fitting as a component of said guide bearings.

9. The fluid actuated friction damper recited in claim 8 wherein said guide bearings and said first and second friction shoe means each comprise a plurality of arcuate segments of low friction material.

10. The fluid actuated friction damper recited in claim 9 wherein the segments of each of said guide bearings and said first and second friction shoe means are peripherally spaced by gaps.

11. The fluid actuated friction damper recited in claim 9 wherein said segments are formed of a material selected to develop interfacial friction by composite/counterface interface.

12. The fluid actuated friction damper recited in claim 9 wherein said segments are formed substantially of polytetrafluoroethylene filled polyphenylene sulfide.

13. The fluid actuated friction damper recited in claim 9 wherein said segments are formed substantially of ultra high molecular weight polyethylene.

14. The fluid actuated friction damper recited in claim 9 wherein said segments are formed substantially of polytetrafluoroethylene and ultra high molecular weight polyethylene.

15. The fluid actuated friction damper recited in claim 2 wherein said means for establishing fluid pressure communication between the external source of pressurized fluid and said first and second fluid pressure responsive means comprises a hollow rod fixed to said inner body, said hollow rod extending axially from an inner end within said cylindrical wall, beyond one end of said cylindrical wall to an outer end, said second fluid pressure responsive means being in continuous communication with the external source of pressure through said hollow rod.

16. The fluid actuated friction damper recited in claim 2 wherein said means for establishing fluid pressure communication between the external source of pressurized fluid and said first and second fluid pressure responsive means comprises separate fluid passageways between the external source of pressurized fluid and said first fluid responsive means and between the external source of pressurized fluid and said second fluid responsive means, respectively.

17. The fluid actuated friction damper recited in claim 16 comprising independently adjustable fluid pressure regulators in each of said separate fluid passageways.

18. The fluid actuated friction damper recited in claim 1 wherein said outer body includes a cylindrical wall and an interior cylindrical surface to establish said continuous friction surface, wherein said inner body includes a rod extending axially beyond one end of said cylindrical wall, the friction damper further comprising guide bearings on opposite ends of said friction shoe means, said guide bearings maintaining concentric alignment of said inner and outer bodies independent of said friction shoe means.

19. The fluid actuated friction damper recited in claim 18 wherein said guide bearings each comprise a plurality of spaced segments of low friction material.

20. The fluid actuated friction damper recited in claim 1 wherein said outer body includes a cylindrical wall and an interior cylindrical surface to establish said continuous friction surface, wherein said means for establishing fluid pressure communication between the external source of pressurized fluid and said fluid pressure responsive means comprises a hollow rod fixed to said inner body, said hollow rod extending axially from an inner end within said cylindrical wall, beyond one end of said cylindrical wall to an outer end, at least one radial port in said hollow rod located axially between said end stops, axially spaced slidable seal means between said hollow rod and said shuttle device to confine passage of fluid between said rod and said shuttle, and at least one shuttle port movable axially between one position located between said spaced seal means and another position located beyond the spaced seal means.

21. A fluid actuated friction damper comprising:
   telescopically moveable inner and outer bodies, each of said bodies having a continuous axial surface and a slide bearing to engage the continuous axial surface of the other of said bodies, thereby to maintain axial concentricity of the inner and outer bodies;
   at least one of the inner and outer bodies having a fluid pressure actuated friction shoe means in engagement with the continuous axial surface of the other of the inner and outer bodies under a normal force determined by regulated fluid pressure;

said slide bearing and said friction shoe means being of a material to provide a dry lubricant interface with the continuous axial surface contacted by the slide bearing and the friction shoe means, respectively, and, wherein one of said slide bearing and friction shoe means on one of the inner and outer bodies is integrated.

22. The fluid actuated friction damper recited in claim 21 wherein the combined slide bearing and friction shoe means is defined by at least one axially extending arcuate shoe segment having a central portion and opposite end portions, said end portions bearing directly between said inner and outer bodies and said central portion being forcible by fluid pressure to exert a variable normal friction force.

23. A fluid actuated friction damper comprising:

telescopically movable inner and outer bodies;

the outer body having an elongated, continuous friction surface;

the inner body comprising friction shoe means engageable with said continuous friction surface, fluid pressure responsive means including an elastomeric tube for exerting a normal force to urge said friction shoe means against said continuous friction surface, a shuttle device supporting said friction shoe means and including a cylindrical sleeve positioned inside of said elastomeric tube and a pair of spaced end rings to close an annulus between the cylindrical sleeve and the elastomeric tube at opposite ends of the tube, said elastomeric tube exerting the normal force of the friction shoe means into engagement with said continuous friction surface independent of fluid pressure in said annulus, said shuttle device being axially movable between end stops on said inner body by frictional drag, caused by said normal force, between said friction shoe means and said friction surface upon relative axial movement of said inner and outer bodies, and means for establishing fluid pressure communication between a source of pressurized fluid and said fluid pressure responsive means when said shuttle device is at one of said stops and for isolating said fluid pressure responsive means from said external source when said shuttle device is moved from said one stop.

24. The fluid actuated friction damper of claim 23 wherein said elastomeric tube is expanded radially by an axial compression between said end rings to develop said normal force.

25. The fluid actuated friction damper of claim 23 wherein said elastomeric tube includes elastic, compressible, exterior projections between said end rings to develop said normal force.

26. The fluid actuated friction damper of claim 25 wherein said exterior projections are provided by at least two circumferential ribs.

27. The fluid actuated friction damper of claim 25 wherein said exterior projections are provided by spaced longitudinal ribs.

* * * * *

UNITED STATES PATENT AND TRADEMARK OFFICE
CERTIFICATE OF CORRECTION

PATENT NO. : 5,595,268
DATED : January 21, 1997
INVENTOR(S) : H. Neil Paton

It is certified that error appears in the above-indentified patent and that said Letters Patent is hereby corrected as shown below:

Front Page of Patent, box [76], correct the inventor's address as follows:

309 Chestnut Street
      San Francisco, CA  94133

Signed and Sealed this

Thirtieth Day of September, 1997

*Attest:*

BRUCE LEHMAN

*Attesting Officer*      *Commissioner of Patents and Trademarks*